(12) United States Patent
Gu et al.

(10) Patent No.: US 10,790,863 B2
(45) Date of Patent: Sep. 29, 2020

(54) BRANCHING TOWER-MOUNTED AMPLIFIER AND ANTENNA FEED SYSTEMCROSS-REFERENCE TO RELATED APPLICATIONS

(71) Applicant: HUAWEI TECHNOLOGIES CO., LTD., Shenzhen (CN)

(72) Inventors: Jiangchun Gu, Shenzhen (CN); Ying Liang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/454,239

(22) Filed: Jun. 27, 2019

(65) Prior Publication Data
US 2019/0319650 A1 Oct. 17, 2019

Related U.S. Application Data

(63) Continuation of application No. PCT/CN2016/112763, filed on Dec. 28, 2016.

(51) Int. Cl.
H04B 1/04 (2006.01)
H01Q 1/12 (2006.01)
H01Q 1/24 (2006.01)
H04B 7/06 (2006.01)
H04W 16/26 (2009.01)
H04W 88/08 (2009.01)

(52) U.S. Cl.
CPC ......... H04B 1/0458 (2013.01); H01Q 1/1242 (2013.01); H01Q 1/246 (2013.01); H01Q 1/247 (2013.01); H04B 7/0615 (2013.01); H04W 16/26 (2013.01); H04B 2001/045 (2013.01); H04W 88/085 (2013.01)

(58) Field of Classification Search
CPC .................................................... H04B 1/0458
See application file for complete search history.

(56) References Cited

U.S. PATENT DOCUMENTS

| 2005/0136875 | A1 | 6/2005 | Skarby et al. |
| 2007/0224932 | A1 | 9/2007 | Wong et al. |
| 2009/0066595 | A1 | 3/2009 | Barker et al. |
| 2013/0288752 | A1 | 10/2013 | He et al. |

(Continued)

FOREIGN PATENT DOCUMENTS

| CN | 1898878 A | 1/2007 |
| CN | 2927564 Y | 7/2007 |

(Continued)

Primary Examiner — Ankur Jain
(74) Attorney, Agent, or Firm — Kilpatrick Townsend & Stockton LLP

(57) ABSTRACT

Embodiments of the present invention relate to the communications field, and provide a branching tower-mounted amplifier and an antenna feed system, so that a branching tower-mounted amplifier is added on an antenna unit side, thereby implementing a function of a four-port RRU, ensuring network coverage, and improving network performance. The branching tower-mounted amplifier includes a first filter module, a second filter module, a first amplification module, a second amplification module, a control module, a first branching module, and a second branching module.

9 Claims, 5 Drawing Sheets

(56) References Cited

U.S. PATENT DOCUMENTS

| | | | | |
|---|---|---|---|---|
| 2015/0111504 A1* | 4/2015 | Zhang | ................... | H01Q 1/246 |
| | | | | 455/67.11 |
| 2015/0327087 A1 | 11/2015 | Xu et al. | | |
| 2016/0072618 A1 | 3/2016 | Liao et al. | | |
| 2016/0191227 A1* | 6/2016 | Pagano | ................ | H04B 7/0413 |
| | | | | 370/281 |
| 2017/0012358 A1 | 1/2017 | Feng et al. | | |

FOREIGN PATENT DOCUMENTS

| | | | |
|---|---|---|---|
| CN | 201789052 U | 4/2011 | |
| CN | 102122975 A | 7/2011 | |
| CN | 102548051 A | 7/2012 | |
| CN | 203225754 U | 10/2013 | |
| CN | 103457622 A | 12/2013 | |
| EP | 2660975 A1 | 11/2013 | |
| JP | 2007282036 A | 10/2007 | |
| JP | 2010506438 A | 2/2010 | |
| WO | 2015143943 A1 | 10/2015 | |

\* cited by examiner

BRANCHING TOWER-MOUNTED AMPLIFIER AND ANTENNA FEED SYSTEMCROSS-REFERENCE TO RELATED APPLICATIONS

CROSS-REFERENCE TO RELATED APPLICATIONS

This application is a continuation of International Application No. PCT/CN2016/112763, filed on Dec. 28, 2016, the aforementioned patent application is hereby incorporated by reference in the entireties.

TECHNICAL FIELD

Embodiments of the present invention relate to the communications field, and in particular, to a branching tower-mounted amplifier and an antenna feed system.

BACKGROUND

As communications technologies continuously develop, a communications network has undergone several generations of network transformation, from a Global System for Mobile Communications (Global System of Mobile communication, GSM) network to a Code Division Multiple Access (Code Division Multiple Access, CDMA) network, a Wideband Code Division Multiple Access (Wideband Code Division Multiple Access Wireless, WCDMA) network, a General Packet Radio Service (General Packet Radio Service, GPRS) network, a Long Term Evolution (Long Term Evolution, LTE) network, a Universal Mobile Telecommunications System (Universal Mobile Telecommunications System, UMTS) network, and the like. In a process of network transformation, a current generation network and a next generation network can coexist. For example, in a process of transition from the CDMA network to the LTE network, a radio frequency module of the CDMA network does not support the LTE network, and therefore radio frequency modules (for example, radio remote units (Radio Remote Unit, RRU)) need to be deployed for the CDMA network and the LTE network separately during network deployment.

Uplink coverage of an antenna feed system is used as an example. FIG. 1 is a schematic diagram of an antenna feed system deployed for a CDMA network and an LTE network. The CDMA network and the LTE network share a four-port antenna unit. The CDMA network uses an RRU (represented by an RRU 1 in FIG. 1) with two ports (for example, two transmit ports and two receive ports (2T2R), or one transmit port and two receive ports (1T2R)). The LTE network uses an RRU (represented by an RRU 2 in FIG. 1) with four ports (for example, two transmit ports and four receive ports (2T4R)). It can be seen from FIG. 1 that the two ports of the RRU 1 are connected to two ports of the four-port antenna unit, and two ports of the RRU 2 are connected to the other two ports of the four-port antenna unit. Therefore, the 2T4R RRU 2 used in the LTE network actually functions merely as a 2T2R RRU. This greatly lowers value of the RRU 2, and causes a waste of resources. To resolve the foregoing problem, with reference to FIG. 1, FIG. 2 is a schematic diagram of another antenna feed system deployed for the CDMA network and the LTE network. Two combiners are added on an antenna unit side, so that a function of the 2T4R RRU 2 in the LTE network can be implemented through combination.

However, because the combiner is usually a 3 dB (dB) bridge or bandwidth coupler, adding two combiners on the antenna unit side may cause an insertion loss of at least 3 dB to the CDMA network and the LTE network. This affects coverage of the CDMA network and the LTE network.

SUMMARY

Embodiments of the present invention provide a branching tower-mounted amplifier and an antenna feed system, so that a branching tower-mounted amplifier is added on an antenna unit side, thereby implementing a function of a four-port RRU, ensuring network coverage, and improving network performance.

To achieve the foregoing objective, the following technical solutions are used in the embodiments of the present invention.

According to a first aspect, an embodiment of the present invention provides a branching tower-mounted amplifier. The branching tower-mounted amplifier includes a first filter module, a second filter module, a first amplification module, a second amplification module, a control module, a first branching module, and a second branching module. The first filter module is connected to the first amplification module. The first amplification module is connected to the control module. The control module is connected to the second amplification module. The second amplification module is connected to the second filter module. The first branching module is connected to both the first filter module and the first amplification module, and the second branching module is connected to both the second filter module and the second amplification module. Both the first branching module and the second branching module are configured to transmit a signal. It can be learned that, on a basis of an existing tower-mounted amplifier, the first branching module and the second branching module that are configured to transmit a receive signal are added to the branching tower-mounted amplifier provided in this embodiment of the present invention. Therefore, when the tower-mounted amplifier is applied to an antenna feed system jointly deployed for a CDMA network and an LTE network, the first branching module and the second branching module of the branching tower-mounted amplifier may be connected to two originally unused ports of a four-port RRU used in the LTE network, so that all ports of the four-port RRU used in the LTE network can implement a receiving and/or sending function. In addition, in the branching tower-mounted amplifier provided in this embodiment of the present invention, the receive signal is first amplified and then split, and therefore no extra insertion loss is caused to the antenna feed system. This ensures network coverage and improves network performance.

In a first optional implementation of the first aspect, the first filter module includes a first transmit filter, a first receive front-end filter, and a first receive back-end filter. One end of the first transmit filter is connected to one end of the first receive front-end filter. One end of the first receive back-end filter is connected to another end of the first transmit filter. The first amplification module includes a first low noise amplifier. A first end of the first low noise amplifier is connected to another end of the first receive front-end filter, and a second end of the first low noise amplifier is connected to another end of the first receive back-end filter. The second filter module includes a second transmit filter, a second receive front-end filter, and a second receive back-end filter. One end of the second transmit filter is connected to one end of the second receive front-end filter. One end of the second receive back-end filter is connected to another end of the second transmit filter. The second amplification module includes a second low noise amplifier. A first end of the second low noise amplifier is connected to another end of the second receive front-end filter, and a second end of the second low noise amplifier is connected to another end of the second receive back-end filter. The control module is connected to both a third end of the first low noise amplifier and a third end of the second low noise amplifier.

In a second optional implementation of the first aspect, the first branching module is a path for transmitting a signal, and the second branching module is another path for transmitting a signal.

In a third optional implementation of the first aspect, the first end of the first low noise amplifier is connected to the second end of the first low noise amplifier, and the first end of the second low noise amplifier is connected to the second end of the second low noise amplifier. In this way, when the first low noise amplifier and/or the second low noise amplifier are/is faulty, the branching tower-mounted amplifier provided in this embodiment of the present invention can still work properly, thereby ensuring stability of a network system.

According to a second aspect, an embodiment of the present invention further provides an antenna feed system. The antenna feed system includes an antenna unit with four ports, a first radio remote unit RRU, a second RRU connected to the antenna unit, and a branching tower-mounted amplifier that has any one of the features in the first aspect and that is connected to each of the antenna unit, the first RRU, and the second RRU. The first RRU has two ports, and the second RRU has four ports.

In a first optional implementation of the second aspect, a first port of the first RRU is connected to a first filter module of the branching tower-mounted amplifier, a second port of the first RRU is connected to a second filter module of the branching tower-mounted amplifier, a first port of the second RRU is connected to a first port of the antenna unit, a second port of the second RRU is connected to a second port of the antenna unit, a third port of the antenna unit is connected to the first filter module of the branching tower-mounted amplifier, a fourth port of the antenna unit is connected to the second filter module of the branching tower-mounted amplifier, a first branching module of the branching tower-mounted amplifier is connected to a third port of the second RRU, and a second branching module of the branching tower-mounted amplifier is connected to a fourth port of the second RRU.

In a second optional implementation of the second aspect, the second RRU is further connected to a control module of the branching tower-mounted amplifier, to supply power to the branching tower-mounted amplifier.

In a third optional implementation of the second aspect, the antenna feed system further includes a smart bias tee SBT; and a first port of the first RRU is connected to a first filter module of the branching tower-mounted amplifier, a second port of the first RRU is connected to a second filter module of the branching tower-mounted amplifier, a first port of the second RRU is connected to a first port of the antenna unit, a second port of the second RRU is connected to one end of the SBT, another end of the SBT is connected to a second port of the antenna unit, a third port of the antenna unit is connected to the first filter module of the branching tower-mounted amplifier, a fourth port of the antenna unit is connected to the second filter module of the branching tower-mounted amplifier, a first branching module of the branching tower-mounted amplifier is connected to a third port of the second RRU, and a second branching module of the branching tower-mounted amplifier is connected to a fourth port of the second RRU.

In a fourth optional implementation of the second aspect, the SBT is further connected to a control module of the branching tower-mounted amplifier, to supply power to the branching tower-mounted amplifier.

For specific descriptions of the second aspect and various implementations of the second aspect of the embodiments of the present invention, refer to the detailed descriptions of the first aspect and various implementations of the first aspect. In addition, for beneficial effects of the second aspect and various implementations of the second aspect, refer to the beneficial effect analysis in the first aspect and various implementations of the first aspect. Details are not described herein again.

In the embodiments of the present invention, names of the foregoing branching tower-mounted amplifier and the antenna feed system do not constitute a limitation on devices or function modules. In actual implementation, these devices or function modules may appear in other names. Provided that functions of the devices or function modules are similar to those in the embodiments of the present invention, the devices or function modules fall within the scope of the claims of the present invention and equivalent technologies thereof.

These or other aspects of the embodiments of the present invention are more concise and comprehensible in the following descriptions.

DESCRIPTION OF EMBODIMENTS

Figure 1:
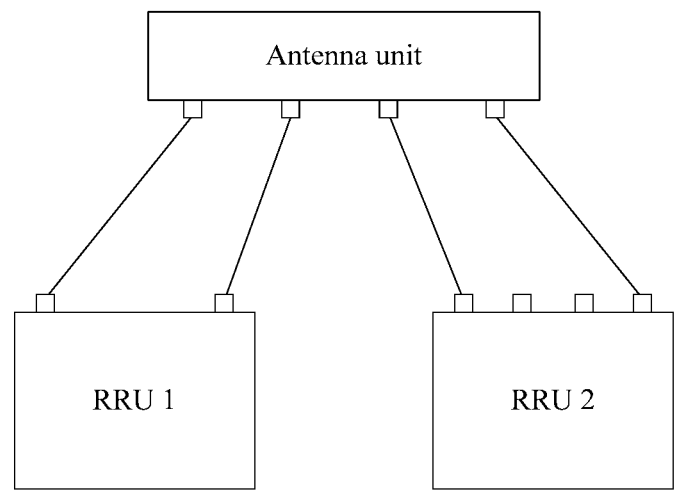
FIG. 1 is a schematic diagram of an antenna feed system deployed for a CDMA network and an LTE network according to an embodiment of the present invention.
Figure 2:
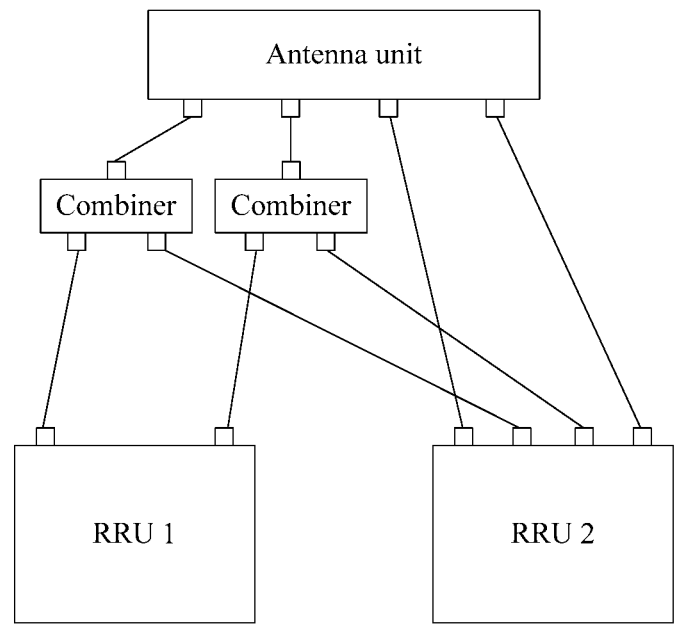
FIG. 2 is a schematic diagram of another antenna feed system deployed for a CDMA network and an LTE network according to an embodiment of the present invention.

In the following descriptions, for a purpose of illustration rather than limitation, specific details such as a particular system structure are provided, to facilitate thorough understanding of this application. However, a person skilled in the art should know that this application may also be implemented in other embodiments without these specific details. In other cases, detailed descriptions of well known structures and methods are omitted, so that this application is described without being disturbed by unnecessary details.

In addition, the terms "including", "comprising", and any variants thereof in the specification, claims, and accompanying drawings of this application are intended to cover a non-exclusive inclusion. For example, a process, a method, a system, a product, or a device that includes a series of steps or units is not limited to listed steps or units, but optionally further includes an unlisted step or unit, or optionally further includes another inherent step or unit of the process, the method, the product, or the device.

Moreover, the term "and/or" in the embodiments of this application describes only an association relationship between associated objects and represents that three relationships may exist. For example, A and/or B may represent the following three cases: Only A exists, both A and B exist, and only B exists. In addition, the character "/" in this specification usually indicates an "or" relationship between associated objects.

In addition, in the specification, claims, and accompanying drawings of the present invention, the terms "first", "second", "third", "fourth", and so on are intended to distinguish between different objects, but do not indicate a particular order. "Up", "down", "left", and "right" described in the embodiments of the present invention are merely used to describe the embodiments of the present invention with reference to the accompanying drawings, but are not used as a limitation.

The technical solutions provided in the embodiments of the present invention may be applied to network deployment in various communications systems, and are particularly applicable to a scenario in which a current generation network and a next generation network can coexist in a process of network transformation.

To help understand the embodiments of the present invention, related elements mentioned in the embodiments of the present invention are first described herein.

A two-port RRU mentioned in the embodiments of the present invention is an RRU with two ports, for example, a 2T2R RRU or a 1T2R RRU. Similarly, a four-port RRU mentioned in the embodiments of the present invention is an RRU with four ports, for example, a 2T4R RRU. The following embodiments of the present invention are all described by using an example in which a two-port RRU is a 2T2R RRU and a four-port RRU is a 2T4R RRU.

In addition, a first RRU and a second RRU (to be specific, an RRU with two ports and an RRU with four ports) mentioned in the embodiments of the present invention may be RRUs deployed for a same communications network or may be RRUs deployed for different communications networks. This is not specifically limited in the embodiments of the present invention.

A 1T2R RRU is an RRU with one receive port and two transmit ports. The 1T2R RRU includes two ports. One of the two ports has a function of receiving data and sending data. The other port only has a function of receiving data, but does not have a function of sending data.

A 2T2R RRU is an RRU with two receive ports and two transmit ports. Referring to an RRU 1 on the left side of FIG. 1, it can be learned that a 2T2R RRU includes two ports. The two ports each have a function of receiving data and sending data.

A 2T4R RRU is an RRU with four receive ports and two transmit ports. Referring to an RRU 2 on the right side of FIG. 1, it can be learned that a 2T4R RRU includes four ports. A leftmost port and a rightmost port of the RRU 2 each have a function of receiving data and sending data. Two middle ports of the RRU 2 only have a function of receiving data, but do not have a function of sending data.

The embodiments of the present invention provide an antenna feed system, so that a branching tower-mounted amplifier is added on an antenna unit side, thereby implementing a function of a four-port RRU, ensuring network coverage, and improving network performance.

It should be noted that the antenna feed system is a system in which an antenna radiates electromagnetic waves to surrounding space. A tower-mounted amplifier may also be referred to as a tower-mounted amplifier, and is a low noise amplifier installed closely behind a receive antenna on a tower.

It should be further noted that ports of an antenna unit and ports of an RRU are numbered when the ports of the antenna unit and the ports of the RRU are described in the embodiments of the present invention. Such numbers are merely intended to facilitate understanding of a connection relationship between the ports of the antenna unit, the ports of the RRU, and a branching tower-mounted amplifier in the embodiments of the present invention, but do not constitute a limitation. Manufacturers of the antenna unit, the RRU, and the branching tower-mounted amplifier may also number the antenna unit, the RRU, and the branching tower-mounted amplifier. This is not specifically limited in the embodiments of the present invention.

The following describes in detail the technical solutions provided in the embodiments of the present invention.

Figure 3:
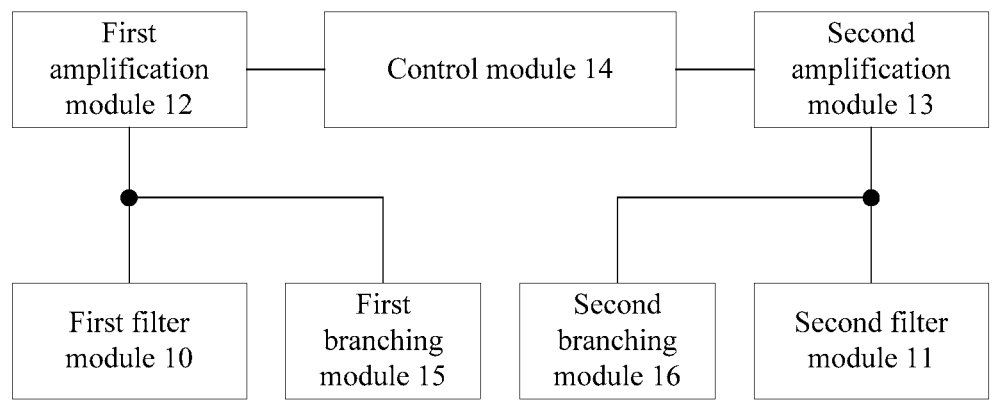
FIG. 3 is a schematic structural diagram 1 of a branching tower-mounted amplifier according to an embodiment of the present invention.

FIG. 3 is a schematic structural diagram of a branching tower-mounted amplifier according to an embodiment of the present invention. The branching tower-mounted amplifier includes a first filter module 10, a second filter module 11, a first amplification module 12, a second amplification module 13, a control module 14, a first branching module 15, and a second branching module 16. The first filter module 10 is connected to the first amplification module 12. The first amplification module 12 is connected to the control module 14. The control module 14 is connected to the second amplification module 13. The second amplification module 13 is connected to the second filter module 11. The first branching module 15 is connected to both the first filter module 10 and the first amplification module 12, and the second branching module 16 is connected to both the second filter module 11 and the second amplification module 13. Both the first branching module 15 and the second branching module 16 are configured to transmit a signal.

Figure 4:
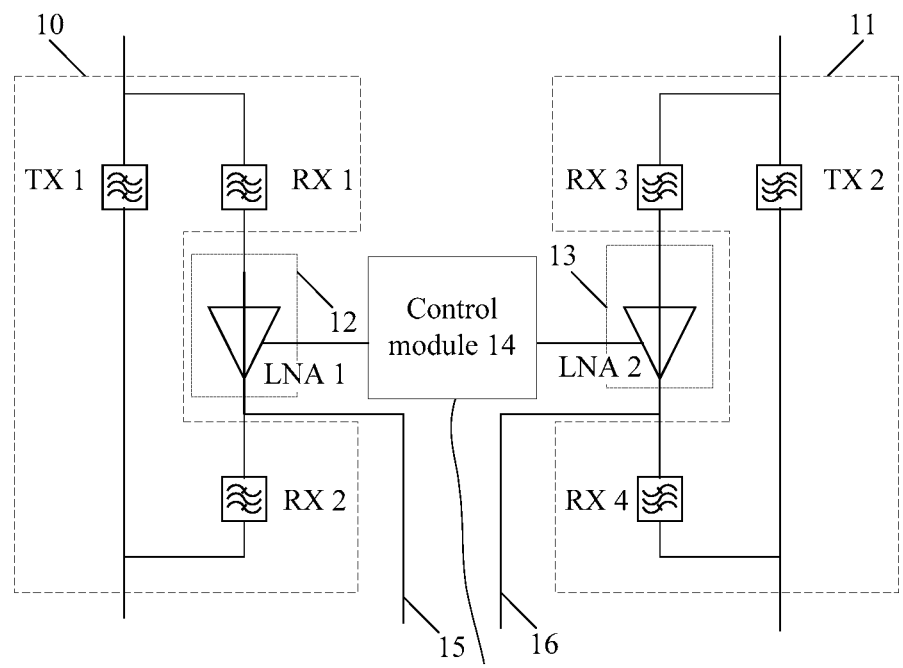
FIG. 4 is a schematic structural diagram 2 of a branching tower-mounted amplifier according to an embodiment of the present invention.

Specifically, FIG. 4 is a schematic structural diagram of another branching tower-mounted amplifier according to an embodiment of the present invention. A first filter module 10 includes a first transmit filter TX 1, a first receive front-end filter RX 1, and a first receive back-end filter RX 2. One end of the first transmit filter TX 1 is connected to one end of the first receive front-end filter RX 1. One end of the first receive back-end filter RX 2 is connected to another end of the first transmit filter.

A first amplification module 12 includes a first low noise amplifier LNA 1. A first end of the first low noise amplifier LNA 1 is connected to another end of the first receive front-end filter RX 1. A second end of the first low noise amplifier LNA 1 is connected to another end of the first receive back-end filter RX 2.

A second filter module 11 includes a second transmit filter TX 2, a second receive front-end filter RX 3, and a second receive back-end filter RX 4. One end of the second transmit filter TX 2 is connected to one end of the second receive front-end filter RX 3. One end of the second receive back-end filter RX 4 is connected to the other end of the second transmit filter.

A second amplification module 13 includes a second low noise amplifier LNA 2. A first end of the second low noise amplifier LNA 2 is connected to another end of the second receive front-end filter RX 3. A second end of the second low noise amplifier LNA 2 is connected to another end of the second receive back-end filter RX 4.

A control module 14 is connected to both a third end of the first low noise amplifier LNA 1 and a third end of the second low noise amplifier LNA 2.

It should be noted that the control module 14 may also be referred to as a control circuit/communication (Control Circuit/Communication) module. Specifically, the control module 14 may include a micro control unit (Microcontroller Unit, MCU), a lightning protection unit, and a remote electrical tilt (RET) antenna port.

A first branching module 15 is a path for transmitting a signal.

A second branching module 16 is another path for transmitting a signal.

It should be noted that the first filter module 10 and the second filter module 11 are configured to perform combining/splitting processing on a transmit signal and a receive signal, and provide a frequency band suppression degree of a transmit signal for the first low noise amplifier LNA 1 and the second low noise amplifier LNA 2, to prevent loop positive feedback of a receive signal in the branching tower-mounted amplifier.

The first amplification module 12 and the second amplification module 13 are configured to amplify a receive signal.

The control module 14 is configured to communicate with a base station, receive direct current power (as shown by a curve drawn from the control module 14 in FIG. 4) that is supplied by an external device (namely, a device other than the branching tower-mounted amplifier) to the branching tower-mounted amplifier through the RET port, and implement detection and alarming for the first low noise amplifier LNA 1 and the second low noise amplifier LNA 2. In addition, when the control module 14 includes the lightning protection unit, the control module 14 may further provide a lightning protection function for the branching tower-mounted amplifier.

It can be learned that when the tower-mounted amplifier is applied to an antenna feed system jointly deployed for a CDMA network and an LTE network, the first branching module and the second branching module of the branching tower-mounted amplifier may be connected to two originally unused ports of a four-port RRU used in the LTE network, so that all ports of the four-port RRU used in the LTE network can implement a receiving and/or sending function. Specifically, the following embodiment describes in detail a structure in which the first branching module and the second branching module of the branching tower-mounted amplifier are connected to the two ports of the four-port RRU used in the LTE network. For brevity, details are not described herein.

Figure 5:
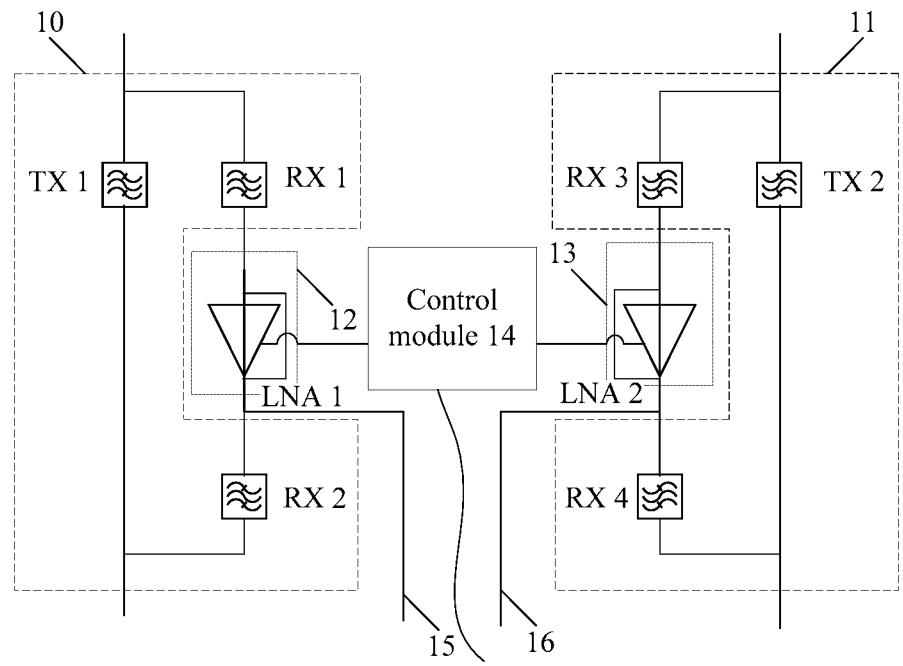
FIG. 5 is a schematic structural diagram 3 of a branching tower-mounted amplifier according to an embodiment of the present invention.

Further, with reference to FIG. 4, as shown in FIG. 5, the first end of the first low noise amplifier LNA 1 may be connected to the second end of the first low noise amplifier LNA 1, and the first end of the second low noise amplifier LNA 2 may be connected to the second end of the second low noise amplifier LNA 2. In this way, when the first low noise amplifier LNA 1 and/or the second low noise amplifier LNA 2 are/is faulty, the branching tower-mounted amplifier provided in this embodiment of the present invention can still work properly, thereby ensuring stability of a network system.

This embodiment of the present invention provides the branching tower-mounted amplifier. The branching tower-mounted amplifier includes the first filter module, the second filter module, the first amplification module, the second amplification module, and the control module. The first filter module is connected to the first amplification module. The first amplification module is connected to the control module. The control module is connected to the second amplification module. The second amplification module is connected to the second filter module. The branching tower-mounted amplifier further includes the first branching module connected to both the first filter module and the first amplification module, and the second branching module connected to both the second filter module and the second amplification module. Based on the foregoing embodiment descriptions, on a basis of an existing tower-mounted amplifier, the first branching module and the second branching module that are configured to transmit a receive signal are added to the branching tower-mounted amplifier provided in this embodiment of the present invention. Therefore, when the tower-mounted amplifier is applied to the antenna feed system jointly deployed for the CDMA network and the LTE network, the first branching module and the second branching module of the branching tower-mounted amplifier may be connected to the two originally unused ports of the four-port RRU used in the LTE network, so that all the ports of the four-port RRU used in the LTE network can implement the receiving and/or sending function. In addition, in the branching tower-mounted amplifier provided in this embodiment of the present invention, the receive signal is first amplified and then split, and therefore no extra insertion loss is caused to the antenna feed system. This ensures network coverage and improves network performance.

An embodiment of the present invention further provides an antenna feed system. The antenna feed system includes an antenna unit with four ports, a first RRU, a second RRU, and a branching tower-mounted amplifier with any one of the foregoing features. The first RRU has two ports, and the second RRU has four ports. The following describes the antenna feed system provided in this embodiment of the present invention, by using an example in which the first RRU is a 2T2R RRU deployed for a CDMA network and the second RRU is a 2T4R RRU deployed for an LTE network.

Example 1

When the branching tower-mounted amplifier is installed on a port of the CDMA network, and the 2T4R RRU and the 2T2R RRU are relatively close to the antenna unit, the 2T4R RRU is further connected to a remote electrical tilt RET antenna port of a control module of the branching tower-mounted amplifier, to supply power to the branching tower-mounted amplifier. Specifically, a schematic structural diagram of the antenna feed system is shown in FIG. 6.

Figure 6:
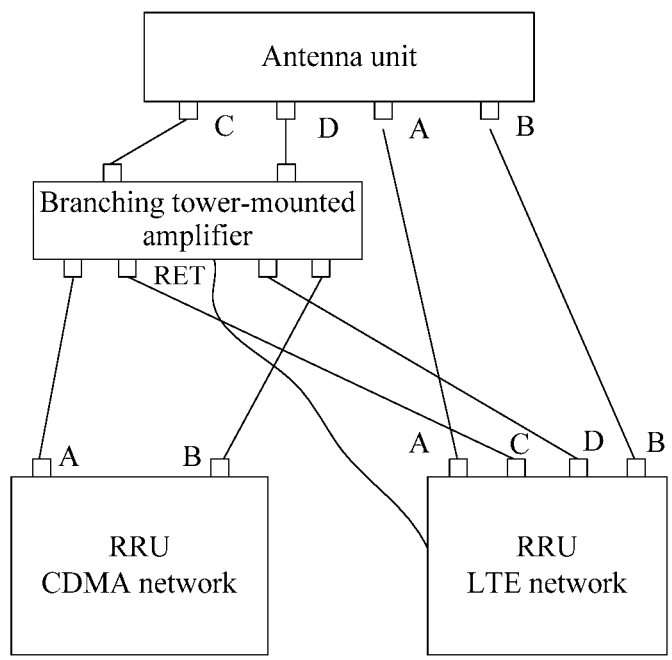
FIG. 6 is a schematic structural diagram 1 of an antenna feed system according to an embodiment of the present invention.

It can be seen from FIG. 6 that a first port A of the 2T2R RRU is connected to a first filter module (not drawn in FIG. 6) of the branching tower-mounted amplifier, a second port B of the 2T2R RRU is connected to a second filter module (not drawn in FIG. 6) of the branching tower-mounted amplifier, a first port A of the 2T4R RRU is connected to a first port A of the antenna unit, a second port B of the 2T4R RRU is connected to a second port B of the antenna unit, a third port C of the antenna unit is connected to the first filter module (not drawn in FIG. 6) of the branching tower-mounted amplifier, a fourth port D of the antenna unit is connected to the second filter module (not drawn in FIG. 6) of the branching tower-mounted amplifier, a first branching module (not drawn in FIG. 6) of the branching tower-mounted amplifier is connected to a third port C of the 2T4R RRU, and a second branching module (not drawn in FIG. 6) of the branching tower-mounted amplifier is connected to a fourth port D of the 2T4R RRU.

Figure 7:
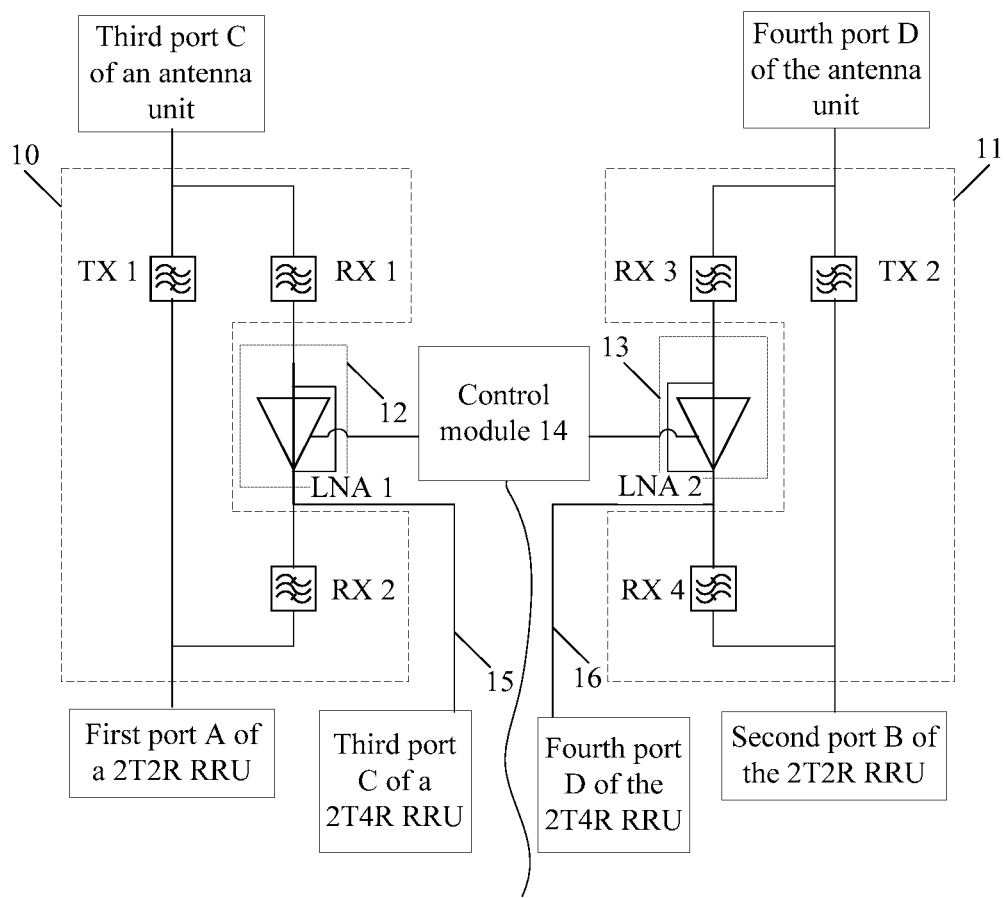
FIG. 7 is a diagram of a local connection between a branching tower-mounted amplifier, and an RRU and an antenna unit according to an embodiment of the present invention.

Referring to FIG. 6, a diagram of a local connection between the branching tower-mounted amplifier, and the RRU and the antenna unit is shown in FIG. 7. It can be learned from FIG. 7 that the first port A of the 2T2R RRU is connected to one end of a first transmit filter TX 1 of the branching tower-mounted amplifier, the second port B of the 2T2R RRU is connected to one end of a second transmit filter TX 2 of the branching tower-mounted amplifier, the third port C of the antenna unit is connected to another end of the first transmit filter TX 1 of the branching tower-mounted amplifier and one end of a first receive front-end filter RX 1 of the branching tower-mounted amplifier, the fourth port D of the antenna unit is connected to another end of the second transmit filter TX 2 of the branching tower-mounted amplifier and one end of a second receive front-end filter RX 3 of the branching tower-mounted amplifier, the first branching module of the branching tower-mounted amplifier is connected to the third port C of the 2T4R RRU, and the second branching module of the branching tower-mounted amplifier is connected to the fourth port D of the 2T4R RRU.

The first branching module and the second branching module of the branching tower-mounted amplifier are paths for transmitting a signal. Therefore, in actual application, the third port C of the 2T4R RRU is connected to a second end of a first low noise amplifier LNA 1, and the fourth port D of the 2T4R RRU is connected to a second end of a second low noise amplifier LNA 2.

Example 2

When the branching tower-mounted amplifier is installed on a port of the CDMA network, and the 2T4R RRU and the 2T2R RRU are relatively far from the antenna unit, the antenna feed system further includes a smart bias tee SBT, and the smart bias tee SBT is further connected to a remote electrical tilt RET antenna port of a control module of the branching tower-mounted amplifier, to supply power to the branching tower-mounted amplifier. Specifically, a schematic structural diagram of the antenna feed system is shown in FIG. 8.

Figure 8:
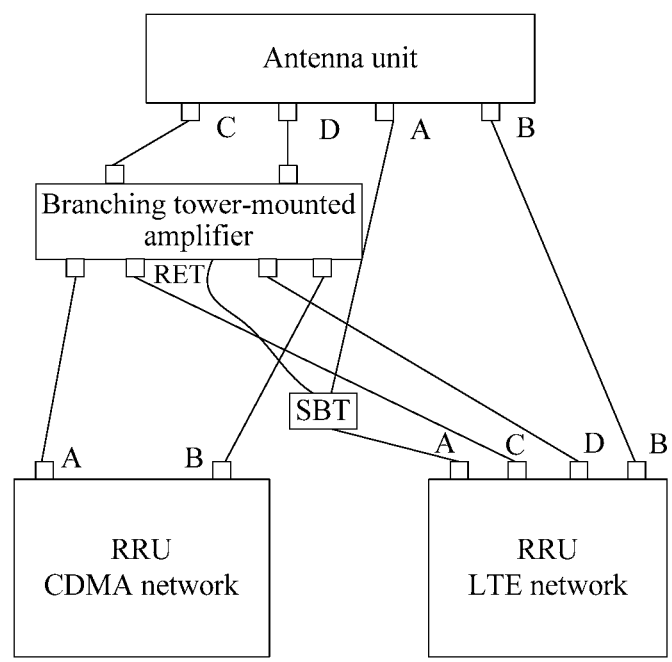
FIG. 8 is a schematic structural diagram 2 of an antenna feed system according to an embodiment of the present invention.

It can be seen from FIG. 8 that a first port A of the 2T2R RRU is connected to a first filter module (not drawn in FIG. 8) of the branching tower-mounted amplifier, a second port B of the 2T2R RRU is connected to a second filter module (not drawn in FIG. 8) of the branching tower-mounted amplifier, a first port A of the 2T4R RRU is connected to a first port A of the antenna unit, a second port B of the 2T4R RRU is connected to one end of the SBT, another end of the SBT is connected to a second port B of the antenna unit, a third port C of the antenna unit is connected to the first filter module (not drawn in FIG. 8) of the branching tower-mounted amplifier, a fourth port D of the antenna unit is connected to the second filter module (not drawn in FIG. 8) of the branching tower-mounted amplifier, a first branching module (not drawn in FIG. 8) of the branching tower-mounted amplifier is connected to a third port C of the 2T4R RRU, and a second branching module (not drawn in FIG. 8) of the branching tower-mounted amplifier is connected to a fourth port D of the 2T4R RRU.

Specifically, a local connection relationship between the branching tower-mounted amplifier, and the RRU and the antenna unit is similar to the local connection relationship between the branching tower-mounted amplifier, and the RRU and the antenna unit described in example 1. For brevity, details are not described herein again.

It can be learned that in the antenna feed system provided in this embodiment of the present invention, when the antenna unit sends receive signals to the RRU deployed for the LTE network and the RRU deployed for the CDMA network, the receive signals are transmitted to the branching tower-mounted amplifier through the third port C of the antenna unit and the fourth port D of the antenna unit, and the receive signals are filtered by using the first receive front-end filter RX 1 and the second receive front-end filter RX 3, and then are amplified by using the first low noise amplifier LNA 1 and the second low noise amplifier LNA 2. Afterwards, a receive signal amplified by the first low noise amplifier LNA 1 is split, and is separately transmitted through the first port A of the 2T2R RRU and the third port C of the 2T4R RRU; and a receive signal amplified by the second low noise amplifier LNA 2 is split, and is separately transmitted through the second port B of the 2T2R RRU and the fourth port D of the 2T4R RRU. In this way, each of the four receive ports of the 2T4R RRU can receive a receive signal, thereby implementing a function of the 2T4R RRU. In addition, the receive signal is first amplified and then split, and therefore no extra insertion loss is caused to the antenna feed system.

This embodiment of the present invention provides the antenna feed system. The antenna feed system includes the antenna unit with four ports, the first RRU, the second RRU, and the branching tower-mounted amplifier with any one of the foregoing features. The first RRU has two ports, and the second RRU has four ports. Based on the foregoing embodiment descriptions, on a basis of an existing tower-mounted amplifier, the first branching module and the second branching module that are configured to transmit a receive signal are added to the branching tower-mounted amplifier provided in this embodiment of the present invention. Therefore, when the tower-mounted amplifier is applied to the antenna feed system jointly deployed for the CDMA network and the LTE network, the first branching module and the second branching module of the branching tower-mounted amplifier may be connected to two originally unused ports of a four-port RRU used in the LTE network, so that all ports of the four-port RRU used in the LTE network can implement a receiving and/or sending function. In addition, in the branching tower-mounted amplifier provided in this embodiment of the present invention, the receive signal is first amplified and then split, and therefore no extra insertion loss is caused to the antenna feed system. This ensures network coverage and improves network performance.

The foregoing descriptions are merely specific implementations of the embodiments of the present invention, but are not intended to limit the protection scope of the embodiments of the present invention. Any variation or replacement readily figured out by a person skilled in the art within the technical scope disclosed in the embodiments of the present invention shall fall within the protection scope of the embodiments of the present invention. Therefore, the protection scope of the embodiments of the present invention shall be subject to the protection scope of the claims.

What is claimed is:

1. A branching tower-mounted amplifier, wherein the branching tower-mounted amplifier comprises a first filter module, a second filter module, a first amplification module, a second amplification module, and a control module, wherein the first filter module is connected to the first amplification module, the first amplification module is directly connected to the control module, the control module is connected to the second amplification module, and the second amplification module is directly connected to the second filter module; and wherein, the branching tower-mounted amplifier further comprises:

a first branching module connected to both the first filter module and the first amplification module, and a second branching module connected to both the second filter module and the second amplification module, wherein both the first branching module and the second branching module are configured to transmit a signal.

2. The branching tower-mounted amplifier according to claim 1, wherein the first filter module comprises a first transmit filter, a first receive front-end filter, and a first receive back-end filter; and one end of the first transmit filter is connected to one end of the first receive front-end filter, and one end of the first receive back-end filter is connected to another end of the first transmit filter;

the first amplification module comprises a first low noise amplifier, wherein a first end of the first low noise amplifier is connected to another end of the first receive front-end filter, and a second end of the first low noise amplifier is connected to another end of the first receive back-end filter;

the second filter module comprises a second transmit filter, a second receive front-end filter, and a second receive back-end filter; and one end of the second transmit filter is connected to one end of the second receive front-end filter, and one end of the second receive back-end filter is connected to another end of the second transmit filter;

the second amplification module comprises a second low noise amplifier, wherein a first end of the second low noise amplifier is connected to another end of the second receive front-end filter, and a second end of the second low noise amplifier is connected to another end of the second receive back-end filter; and the control module is connected to both a third end of the first low noise amplifier and a third end of the second low noise amplifier.

3. The branching tower-mounted amplifier according to claim 2, wherein the first end of the first low noise amplifier is connected to the second end of the first low noise amplifier, and the first end of the second low noise amplifier is connected to the second end of the second low noise amplifier.

4. The branching tower-mounted amplifier according to claim 1, wherein the first branching module is a path for transmitting a signal, and the second branching module is another path for transmitting a signal.

5. An antenna feed system, wherein the antenna feed system comprises an antenna unit with four ports, a first radio remote unit RRU, a second RRU connected to the antenna unit, and the branching tower-mounted amplifier according to claim 1 that is connected to each of the antenna unit, the first RRU, and the second RRU; and the first RRU has two ports, and the second RRU has four ports.

6. The antenna feed system according to claim 5, wherein a first port of the first RRU is connected to the first filter module of the branching tower-mounted amplifier, a second port of the first RRU is connected to the second filter module of the branching tower-mounted amplifier, a first port of the second RRU is connected to a first port of the antenna unit, a second port of the second RRU is connected to a second port of the antenna unit, a third port of the antenna unit is connected to the first filter module of the branching tower-mounted amplifier, a fourth port of the antenna unit is connected to the second filter module of the branching tower-mounted amplifier, the first branching module of the branching tower-mounted amplifier is connected to a third port of the second RRU, and the second branching module of the branching tower-mounted amplifier is connected to a fourth port of the second RRU.

7. The antenna feed system according to claim 6, wherein the second RRU is further connected to the control module of the branching tower-mounted amplifier, to supply power to the branching tower-mounted amplifier.

8. The antenna feed system according to claim 5, wherein the antenna feed system further comprises a smart bias tee SBT; and a first port of the first RRU is connected to the first filter module of the branching tower-mounted amplifier, a second port of the first RRU is connected to the second filter module of the branching tower-mounted amplifier, a first port of the second RRU is connected to a first port of the antenna unit, a second port of the second RRU is connected to one end of the SBT, another end of the SBT is connected to a second port of the antenna unit, a third port of the antenna unit is connected to the first filter module of the branching tower-mounted amplifier, a fourth port of the antenna unit is connected to the second filter module of the branching tower-mounted amplifier, the first branching module of the branching tower-mounted amplifier is connected to a third port of the second RRU, and the second branching module of the branching tower-mounted amplifier is connected to a fourth port of the second RRU.

9. The antenna feed system according to claim 8, wherein the SBT is further connected to the control module of the branching tower-mounted amplifier, to supply power to the branching tower-mounted amplifier.

* * * * *